March 16, 1948.  S. GODET  2,437,951
FOLLOW-UP CONTROL
Filed March 1, 1943
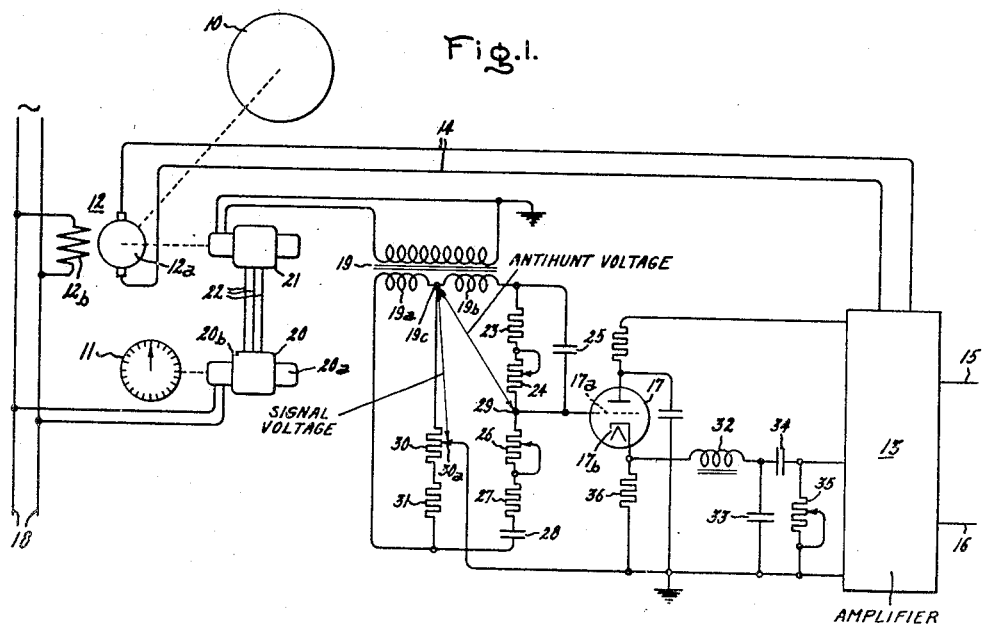
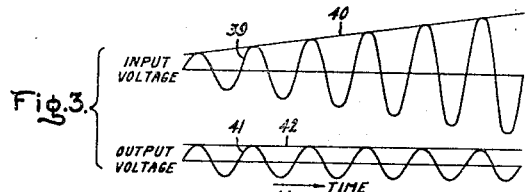
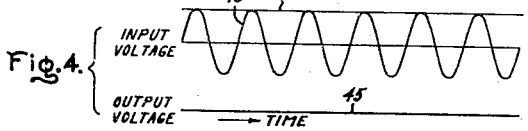
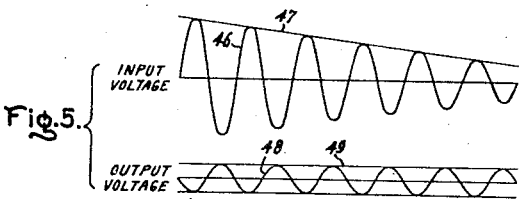
Inventor:
Sidney Godet,
by Harry E. Dunham
His Attorney.

Patented Mar. 16, 1948

2,437,951

UNITED STATES PATENT OFFICE 2,437,951

FOLLOW-UP CONTROL

Sidney Godet, Albany, N. Y., assignor to General Electric Company, a corporation of New York Application March 1, 1943, Serial No. 477,508

6 Claims. (Cl. 318—30)

1

This invention relates to the control of electric motors, more particularly to follow-up control, and it has for an object the provision of a simple, reliable, inexpensive and improved control of this character.

A further object of the invention is the provision of a follow-up control in which the follow-up motor is supplied from an electric valve type amplifier with an alternating voltage which is an amplified replica of a periodically varying control voltage, the magnitude of which is proportional to the error of the system.

A still further object of the invention is the provision of stabilizing means for the system which superimposes on the signal voltage supplied to the amplifier a periodically varying voltage which is directly derived from the error voltage and is of such phase and magnitude as substantially to eliminate hunting of the system.

In carrying the invention into effect in one form thereof, means are provided for producing a periodically varying control voltage of variable magnitude. An electric valve type amplifier serves to supply to the follow-up motor an amplified replica of this control voltage. This amplifier has an output circuit which is connected to the follow-up motor and an input circuit which has connections to the control voltage producing means. For stabilizing the operation of the system, an A. C. resistance-reactance bridge type network is provided. The electrical constants of this bridge are so designed that the modulation envelope of the output voltage is the first derivative of the modulation envelope of its input voltage. The error voltage of the system is supplied to the input terminals of this bridge network and the output voltage of the network is supplied to the input circuit of the electric valve type amplifier as an anti-hunt or stabilizing voltage. The signal voltage which is supplied to the input circuit of the electric valve type amplifier is derived from the voltage across one arm of the bridge.

For a better and more complete understanding of the invention, reference should now be had to the following specification and to the accompanying drawing in which Fig. 1 is a simple diagrammatical illustration of an embodiment of the invention; and Figs. 2, 3, 4, and 5 are charts of electrical characteristics of the resistance-reactance bridge network which serves to facilitate an understanding of the operation of the invention.

Referring now to the drawing, an object 10 is to be driven into positional agreement with a pilot device or director 11 by suitable driving means, such, for example, as represented by the universal electric motor 12 to the drive shaft of which the object 10 is connected by means of suitable reduction gearing (not shown). An alternating voltage is supplied to the armature of motor 12 by means of a suitable electric valve type amplifier 13 to the output terminals of which the armature of the motor 12 is connected by means of conductors 14.

Although the amplifier 13 may be of any suitable type, it is preferably a class A—B$_2$ multi-stage amplifier having a push-pull output stage driven by a class A single-ended stage. Amplifiers of this character are available on the market and since the details of the amplifier per se constitute no part of this invention, the amplifier is illustrated conventionally in the drawing. Direct current power is supplied to the power input terminals of the amplifier from a suitable source, which is represented in the drawing by the two supply lines 15 and 16. This direct current power is supplied to the anodes and cathodes of the electric valve comprising the successive stages of the amplifier.

The first or input stage of the amplifier 13 comprises a single triode vacuum valve 17 which, for convenience in explanation, is illustrated outside the rectangle which conventionally represents the entire amplifier 13.

This amplifier supplies to the armature of the universal motor 12 a faithful, but greatly amplified, replica of any signal voltage which is impressed on the input circuit of the amplifier, i. e., across the grid 17a and the cathode 17b of the first stage triode valve 17.

For the purpose of supplying a voltage to the input circuit of valve 17 which is proportional to the system error, i. e., the positional disagreement of the driven object 10 and pilot device 11, the input circuit of valve 17 is connected to a source of alternating voltage 18 through a transformer 19 having a center tap secondary winding and rotary induction apparatus illustrated as comprising a rotary induction device 20, referred to as the transmitter, and a somewhat similar rotary induction device 21, referred to as the receiver regulator. The rotary induction device 20 comprises a rotor member 20a provided with a single phase primary winding (not shown) and a stator member 20b provided with a distributed three-element winding (not shown) which is physically similar to the polyphase winding of an ordinary wound rotor induction motor. The stator and rotor windings are arranged in inductive relationship with each other so that the alternating magnetic field produced by the current flowing in the primary winding induces voltages in the elements of the secondary winding. The receiver regulator 21 is in all respects identical with the transmitter 20 and the terminals of its stator winding are connected to the terminals of the stator winding of the transmitter by means of conductors 22 so that the voltages induced in the stator winding of the transmitter cause currents to flow in the stator winding of the receiver regulator thereby to produce a magnetic field similar to the magnetic field produced by the current flowing in the rotor winding of the transmitter.

The rotor of the transmitter 20 is mechanically connected through suitable gearing (not shown) to the movable element of the pilot device 11. The ratio of this gearing between the pilot device and the rotor of the transmitter may be any suitable value, but in the present embodiment of the invention it is assumed to be 1:1. The rotor of the receiver regulator 21 is connected either to the shaft of the motor 12 or to the shaft of the driven object 10 by means of suitable gearing (not shown) having the same ratio as the gearing between the pilot device and the transmitter.

The initial relative arrangement of the rotors of the transmitter 20 and receiver regulator 21 is such that when the system is in correspondence, the axis of the rotor winding of the receiver 21 is at right angles to the axis of the magnetic field produced by the current flowing in the stator winding so that the voltage induced in the rotor winding is zero. Rotation of the rotor member of the transmitter causes a voltage to be induced in the rotor winding of the receiver owing to the shift in the position of the axis of the magnetic field of the receiver relative to the axis of the coil of the rotor member, and the magnitude of this induced voltage depends upon the relationship of the axis of this winding to the axis of the magnetic field, e. g., when the axes of the magnetic field and of the rotor winding are parallel, the induced voltage is maximum, whereas when these axes are at right angles with each other, the induced voltage is zero. Thus, rotation of the rotor of the transmitter or of the receiver regulator will vary the magnitude of the voltage which is supplied through the transformer 19 to the input circuit of the amplifier which, in turn, will result in variation of the current flowing in the anode-cathode circuits of the valves comprising the successive stages of the amplifier.

For the purpose of preventing hunting in the operation of the system, an anti-hunting network is provided in the connections between the receiver regulator and the input stage of the amplifier. This network is an A. C. resistance-reactance bridge type network of which the two halves 19a and 19b of the secondary winding of the transformer 21 constitute the ratio arms. The third arm of the bridge comprises permanent resistor 23 and adjustable resistor 24 connected in series relationship with each other and capacitor 25 connected in parallel with these resistors. The fourth arm of the bridge comprises the adjustable resistor 26, fixed resistor 27 and capacitor 28 connected in series relationship with each other. Thus, the center tap 19c of the transformer secondary winding and the common terminal 29 of the adjustable resistors 24 and 26 constitute the output terminals of the bridge.

A voltage divider comprising series connected adjustable resistor 30 and fixed resistor 31 is connected across the half 19a of the secondary winding. The slider 30a of this voltage divider is connected to the cathode 17b of the first stage valve 17 of the amplifier and the terminal 29 is connected to the grid 17a of valve 17.

The bridge is balanced for the frequency of the source 18 by adjustment of the variable elements of the third and fourth arms of the bridge. When the bridge is balanced, the voltage at the output terminals 19c and 29 is zero and remains zero for any constant magnitude of the effective value of the input voltage, i. e., the voltage induced in the secondary windings 19a, 19b of the transformer. However, when the magnitude of the effective value of the periodically varying input voltage varies, a periodically varying voltage appears across the output terminals whose modulation envelope is the first derivative of the modulation envelope of the input voltage. This first derivative voltage is supplied to the input circuit of the electric valve 17 and it serves substantially to eliminate hunting in the operation of the system.

The signal voltage input to valve 17 is taken from the voltage divider comprising resistors 30 and 31. If the slider is moved to the zero position, i, e., to the top of resistor 30, then the only voltage supplied to the input circuit of the valve 17 is the anti-hunt voltage which appears across the center tap 19c and terminal 29. By moving the slider downward from the zero position a signal voltage is derived from the half 19a of the secondary winding of the transformer and is supplied to the input circuit of the amplifier. The magnitude of this signal voltage is increased in proportion to the movement of the slider away from the zero position.

For the purpose of adjusting the phase of the current supplied to the armature 12a of motor 12 relative to the current supplied to the field winding 12b, a suitable phase shifting network comprising a choke coil 32, capacitors 33 and 34 and an adjustable potentiometer 35 is provided. This phase shifting network is connected across the cathode follower resistance 36 in the cathode circuit of valve 17 and the input circuit of the second stage of the amplifier is connected across the potentiometer 35. By varying the potentiometer 35, the phase of the output current of the amplifier can be adjusted through a substantial range of values.

With the foregoing understanding of the elements and their organization, the operation of the system itself will readily be understood from the following description.

When the system is at rest, with the driven object 10 in positional agreement with the pilot device 11, the system error is zero and zero voltage is induced in the rotor windings of the receiver regulator. Consequently, the input voltage of the anti-hunt network and the output or anti-hunt voltage are both zero. This condition is represented in Fig. 2 in which the straight line curve 37 of zero magnitude represents the input voltage to the anti-hunt bridge network and the straight line curve 38 of zero magnitude represents the output or anti-hunt voltage. Since the error voltage, i. e., the voltage supplied to the transformer 19, is zero, the signal voltage which appears across the midtap 19c and slider 30a is also zero and consequently the amplifier supplies zero output current to the armature of the follow-up motor 12 and the motor is consequently at rest.

Rotation of the pilot device 11 in a clockwise direction produces a corresponding rotation of the axis of the magnetic field of the receiver regulator 21 with the result that an error voltage is supplied to the primary winding of transformer 19 which is proportional to the positional disagreement of the pilot device and driven object. This error voltage induces a voltage in the secondary windings 19a and 19b which is represented in Fig. 3 by the sinusoidal curve 39. This voltage is the input voltage of the anti-hunt bridge network and is accordingly denoted input voltage.

A signal voltage appears between the center tap 19c and slider 30a which is a replica of input voltage 39 and in phase therewith. This signal voltage is supplied to the input circuit of the amplifier and an amplified replica of this signal voltage is supplied to the armature 12a of follow-up motor 12. As a result, a current is caused to flow in the armature circuit of the follow-up motor which current is in phase with the field current. The motor is thus energized for rotation in a direction to drive the driven object 10 in a clockwise direction into positional agreement with the pilot device 11. If the rotation of the pilot device is in a counterclockwise direction, the phase of the error voltage is reversed and the current supplied to the armature of the follow-up motor is 180° out of phase with the field current. As a result, the motor drives the driven object 10 in a counterclockwise direction toward a position of correspondence with the pilot device.

As the magnitude of the error increases, the magnitude of the input voltage increases correspondingly. The rate of this increase is represented as being constant and this condition is indicated in Fig. 3 by the linear modulation envelope 40 of constant slope. Since the modulation envelope of the input voltage 39 is a straight line of constant slope and since the modulation envelope of the output or anti-hunt voltage appearing across midtap 19c and terminal 29 is the first derivative of the modulation envelope of the input voltage, the output voltage must be a periodically varying voltage of constant magnitude as represented by the sinusoidal curve 41 of constant amplitude having a modulation envelope 42 of zero slope. This output voltage is supplied to the input circuit of the amplifier as an anti-hunt voltage. It is in phase with the input voltage and, therefore, in phase with the signal voltage which, as pointed out in the foregoing, is in phase with the input voltage. Thus, under conditions of increasing error in the system, the anti-hunt voltage adds to the signal voltage thereby further to increase the current supplied to the follow-up motor. As a result, the speed of the motor is increased and the error is decreased to a value at which a balanced condition of the system is established. This balanced condition exists when the error is reduced to such magnitude that the current supplied by the amplifier to the follow-up motor causes the latter to drive the driven object 10 at a speed equal to the speed of the pilot device.

The error remains constant at this value as long as the speed of the pilot device remains constant and consequently the input voltage to the anti-hunt bridge network remains constant, as indicated in Fig. 4 in which the input voltage is represented by the sinusoidal curve 43 of constant amplitude. Since the modulation envelope represented by the straight line 44 has zero slope, the magnitude of the modulation envelope of the output voltage, which is the first derivative of the modulation of the input voltage, is zero as represented in Fig. 4 by the straight line curve 45 of zero magnitude. The envelope being zero, the voltage itself must also be zero. Consequently, when the error is constant the anti-hunt voltage is zero and the speed of the motor is controlled solely by the signal voltage.

The condition of decreasing error is illustrated in Fig. 5 in which the error or input voltage is represented by the sinusoidal curve 46 of decreasing amplitude and having a modulation envelope 47 of constant slope. The decreasing value of the input voltage produces an output or anti-hunt voltage which is represented by the sinusoidal curve 48. Since the modulation envelope of the output or anti-hunt voltage is the first derivative of the modulation envelope of the input voltage which has a constant slope, the modulation envelope of the anti-hunt voltage has zero slope as represented by the horizontal straight line curve 49. Consequently, the anti-hunt voltage has constant maximum value. Owing to the decreasing magnitude of the input voltage, the output voltage is 180° out of phase with the input voltage and, therefore, also 180° out of phase with the signal voltage which is in phase with the input voltage.

Thus, when the error is decreasing, the anti-hunt voltage subtracts from the signal voltage in anticipation of the condition of correspondence in the system. As a result, the voltage supplied to the follow-up motor is reduced to zero before the driven object comes into correspondence with the pilot device. Thus, the tendency to overshoot and hunt about the position of correspondence is substantially eliminated. During a very rapid decrease of error, the anti-hunt voltage may be of sufficient magnitude to reverse the polarity of the voltage supplied to the follow-up motor and thus bring about a strong braking action of the follow-up motor so as to bring it to rest without overshooting.

Although, in accordance with the provisions of the patent statutes, this invention is described as embodied in concrete form and the principle thereof has been explained together with the best mode in which it is now contemplated applying that principle, it will be understood that the apparatus shown and described is merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. A follow-up control comprising in combination, means for producing a periodically varying control voltage, electric valve means for amplifying said voltage, an electric motor supplied from said electric valve means, and stabilizing means comprising a resistance-reactance network included in the connections between said control voltage producing means and said electric valve means for supplying to said electric valve means a periodically varying voltage having the same periodicity as the periodicity of said control voltage and having a modulation envelope which is the first derivative of the modulation envelope of said control voltage.

2. A follow-up control comprising in combination, a source of periodically varying control voltage, an electric motor, means for supplying to said motor an amplified replica of said periodically varying voltage comprising electric valve apparatus provided with a control grid and electrical connections from said source to said grid, and means for stabilizing the operation of said motor with respect to said control voltage comprising a resistance-reactance bridge included in said connections for superimposing on the voltage supplied to said grid a periodically varying voltage having the same periodicity as the periodicity of said control voltage and having a modulation envelope which is the first derivative of the modulation envelope of said control voltage.

3. A follow-up control comprising in combination, a source of periodically varying control voltage having a modulation envelope of variable magnitude, an electric motor, means for supplying to said motor an amplified replica of said periodically varying control voltage comprising electric valve apparatus provided with an output circuit connected to said motor and an input circuit having connections to said source of control voltage, and stabilizing means for supplying to said input circuit a periodically varying voltage having the same periodicity as the periodicity of said control voltage and having a modulation envelope which is the first derivative of the modulation envelope of said control voltage, comprising a bridge network having a pair of ratio arms, a third arm comprising resistance and reactance in parallel, a fourth arm comprising resistance and reactance in series, and potentiometer means included in said connections for causing to be supplied to said input circuit a signal voltage derived from said control voltage.

4. A follow-up control comprising in combination, a source of periodically varying control voltage having a modulation envelope of varying magnitude, a universal electric motor, having an armature and a field winding, means for supplying to the armature of said motor an amplified replica of said control voltage comprising electric valve apparatus provided with an output circuit connected to the armature of said motor and with an input circuit having electrical connections to said source of control voltage, stabilizing means for supplying to said input circuit a periodically varying voltage having the same periodicity as the periodicity of said control voltage and having a modulation envelope which is the first derivative of the modulation envelope of said control voltage, means for supplying to said field winding a periodically varying voltage having the same periodicity as said control voltage, and means for adjusting the phase of the voltage supplied to said armature relative to the voltage supplied to said field winding.

5. A follow-up control comprising in combination, a source of periodically varying control voltage having a modulation envelope of varying magnitude, an electric motor, means for supplying to said motor an amplified replica of said signal voltage comprising electric valve apparatus provided with an output circuit connected to said motor and with an input circuit having electrical connections to said source, and stabilizing means for superimposing on the voltage supplied to said input circuit a periodically varying voltage having a modulation envelope that is the first derivative of the modulation envelope of said control voltage comprising a bridge network included in said connections having a pair of ratio arms, a third arm comprising a resistor and a capacitor in parallel and a fourth arm having a resistor and a capacitor in series.

6. A follow-up control comprising in combination, a source of periodically varying control voltage having a modulation envelope of varying magnitude, an electric motor, means for supplying to said motor an amplified replica of said signal voltage comprising electric valve apparatus provided with an output circuit connected to said motor and with an input circuit, and stabilizing means for supplying to said input circuit a periodically varying voltage having a modulation envelope that is the first derivative of the modulation envelope of said control voltage comprising a bridge network having a pair of ratio arms, a third arm comprising a capacitor and a resistor in parallel and a fourth arm comprising a capacitor and a resistor in series, electrical connections from said source for applying said control voltage across said ratio arms, electrical connections from the junction point of said ratio arms and the junction point of said third and fourth arms to said input circuit, and means for varying said ratio arms thereby to cause to be supplied to said input circuit a signal voltage derived from said control voltage.

SIDNEY GODET.

REFERENCES CITED

The following references are of record in the file of this patent:

UNITED STATES PATENTS

| Number | Name | Date |
| --- | --- | --- |
| 2,088,654 | Hull | Aug. 3, 1937 |